United States Patent [19]

Zinnai et al.

[11] 4,258,901

[45] Mar. 31, 1981

[54] VALVE SEALING DEVICE

[75] Inventors: Sadazi Zinnai, Yokohama; Takeshi Okayasu, Ichikawa, both of Japan

[73] Assignee: Tokyo Koso Kabushiki Kaisha, Saitama, Japan

[21] Appl. No.: 47,293

[22] Filed: Jun. 11, 1979

[30] Foreign Application Priority Data

Jan. 26, 1979 [JP] Japan ............................ 54-7247

[51] Int. Cl.³ ............................................. F16K 25/00
[52] U.S. Cl. ...................................... 251/173; 251/174; 251/306; 251/315
[58] Field of Search ............... 251/173, 172, 315, 174, 251/306

[56] References Cited

U.S. PATENT DOCUMENTS

| | | | |
|---|---|---|---|
| 3,642,248 | 2/1972 | Benware | 251/172 |
| 3,734,457 | 5/1973 | Roos | 251/173 |
| 4,061,307 | 12/1977 | Yoshike | 251/315 |

*Primary Examiner*—Harold W. Weakley
*Attorney, Agent, or Firm*—Stevens, Davis, Miller & Mosher

[57] ABSTRACT

A sealing device for a valve which includes a valve body having a fluid passage and an inner valve for opening or closing said fluid passage, said sealing device comprising a seat packing disposed in a peripheral groove formed in the valve body and partly projecting therefrom into the fluid passage, said seat packing being so constructed that the durability and the fluid shut-off performance are promoted by the combined effect of the fluid pressure in the fluid passage acting against said seat packing and the elastic force of a metallic annular elastic member associated with said seat packing.

5 Claims, 8 Drawing Figures

VALVE SEALING DEVICE

SUMMARY OF THE INVENTION

The present invention relates to a valve including a valve body having a fluid passage and an inner valve for opening or closing said fluid passage and, more particularly, it relates to a sealing device for such valve to completely shut off the flow of fluid at the valve closed position.

It is an object of the present invention to provide a sealing device of self-adjustable, elastic seat packing type, which can completely shut off the flow of fluid, irrespectively of the flowing direction of fluid relative to the sealing device and which has sufficiently high durability to keep its initial performance for a long time.

It is another object of the present invention to provide a sealing device of self-adjustable, elastic seat packing type, which utilizes the pressure of the fluid at the valve closed position to completely shut off the fluid even if the fluid is fed under high pressure.

It is a further object of the present invention to provide a sealing device for a valve of self-adjustable, elastic seat packing type, which employs a member of synthetic resin having no mechanical elasticity together with an elastic member of metallic material to supplement mechanical elasticity and restoring force.

It is a further object of the present invention to provide a valve which can be operated effectively with small operating force, while providing satisfactory shut-off performance.

In accordance with the present invention there is provided a sealing device for a valve which includes a valve body having a fluid passage and an inner valve for opening or closing said fluid passage, said sealing device comprising a seat packing of synthetic resin disposed in a peripheral annular groove having a nearly T-shape cross section formed around the fluid passage of the valve body and partly projecting from said groove into the fluid passage, said seat packing including a shoulder formed on one of its side surfaces transverse to said fluid passage at the position nearest to said fluid passage in order to prevent said seat packing from wholly projecting into said fluid passage, an annular elastic member of metal having nearly V-shape cross section mounted on the other side surface of said seat packing, a recessed portion formed on the part of the seat packing opposite to said fluid passage in order to introduce the fluid pressure existing in the fluid passage thereinto, and an annular contact surface formed on said part of the seat packing and adapted to come into sealing contact with the valve body to shut off the flow of the fluid, in which said seat packing makes contact, at the portion thereof projecting into the fluid passage, with said inner valve, and the elastic force of said annular elastic member and the fluid pressure acting on the seat packing serve to increase the durability and the fluid shut-off capacity of the seat packing.

The invention will be hereinafter explained with reference to the drawings which illustrate embodiments of the invention.

BRIEF DESCRIPTION OF THE DRAWINGS

The drawings illustrate preferred embodiments of the invention, in which.

PREFERRED EMBODIMENTS

Figure 1:
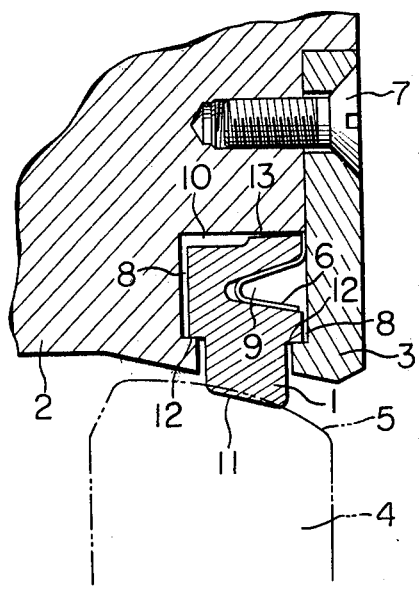
FIG. 1 is a fragmentary enlarged sectional view of an embodiment of the sealing device according to the present invention, showing principal parts of the device in the state where the inner valve for shutting off the flow of fluid does not act against the sealing device.

Now, the invention will be explained with reference to FIGS. 1–8. In the drawings, 1 is a seat packing, 2 is a valve body, 3 is a retainer of the seat packing, 4 is an inner valve for opening or closing the flow of fluid, 5 is a seat surface which is adapted to come into sealing contact with the seat packing 1 to completely shut off the flow of fluid, 6 is a metallic elastic member which serves to prevent the seat packing from subjecting to a permanent deformation at the time of shut off of the fluid flow, 7 is a screw for fixing the seat packing retainer 3 to the valve body 2, 8 is a clearance formed between the side surface of the seat packing 1 and the groove having nearly a T-shape cross section, 9 is a first fluid pressure introducing chamber formed by the metallic elastic member having a nearly V-shape cross section and 10 is a second fluid pressure introducing chamber formed between the seat packing 1 and the valve body 2.

Now the seat packing 1 will be explained more in detail. The groove having nearly T-shape in cross section is formed in transverse direction to the fluid passage and the seat packing 1 is inserted in said groove. The seat packing 1 has an inclined surface 11 at the contact portion with the inner valve, a shoulder 12 formed on one of its side surfaces transverse to said fluid passage in order to prevent said seat packing from wholly projecting into said fluid passage and a recessed portion formed on the part opposite to said fluid passage to form the second fluid introducing chamber 10. If the fluid pressure is relatively low, such second fluid introducing chamber 10 may be omitted.

Figure 6:
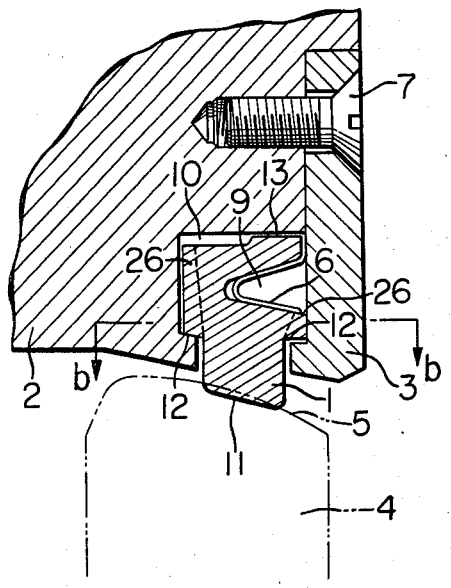
FIG. 6 is a fragmentary enlarged sectional view of a modified form in which fluid pressure introducing slots are formed in the seat packing according to the present invention.
Figure 7:
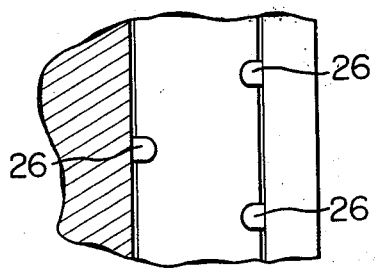
FIG. 7 is a sectional view taken along line b—b in FIG. 6.

In case where a synthetic resin having a lower mechanical strength is employed, it is advantageous to tightly fit the seat packing 1 in the nearly T-shaped groove. In this case, it is necessary to form fluid pressure introducing passages 26 in the side surface of the seat packing 1, as shown in FIGS. 6 and 7. If the fluid pressure is relatively low, such passage may not be required.

Figure 8:
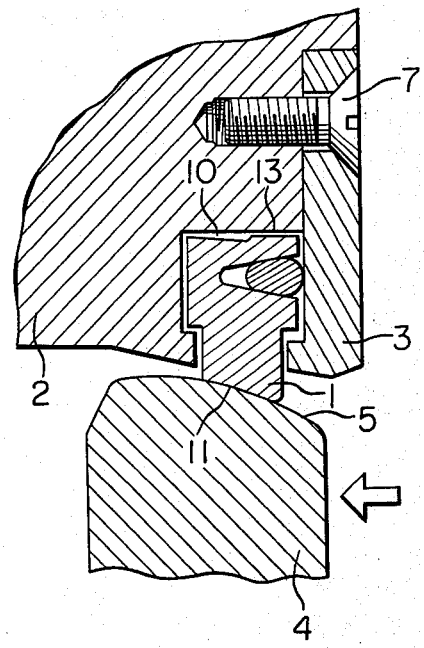
FIG. 8 is a fragmentary enlarged sectional view showing a further embodiment in which a O-ring of synthetic rubber is employed in place of the metallic elastic member.

An O-ring of synthetic rubber or the like may be used in place of the metallic elastic member 9, as shown in FIG. 8, if such material is corrosion-resistant to the fluid used and the fluid has low temperature and low pressure.

The seat packing 1 may be advantageously made of synthetic resin having a superior wear-resistant property such as tetrafluoroethylene.

Figure 3:
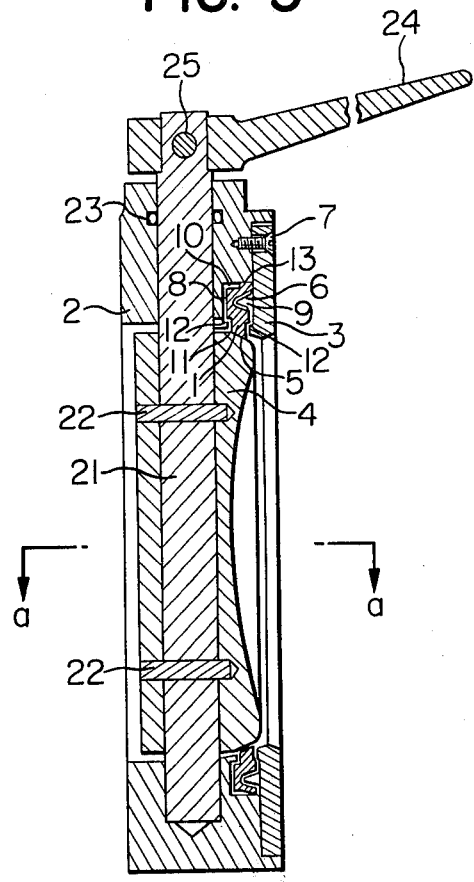
FIG. 3 is longitudinal sectional view showing another embodiment of the sealing device of the present invention applied to a butterfly valve.
Figure 4:
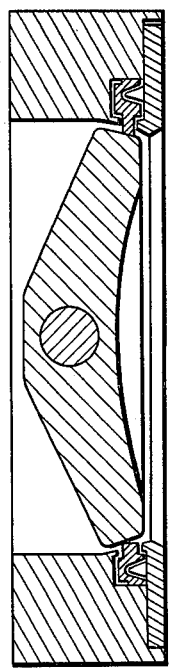
FIG. 4 is a sectional view taken along line a—a in FIG. 3.
Figure 5:
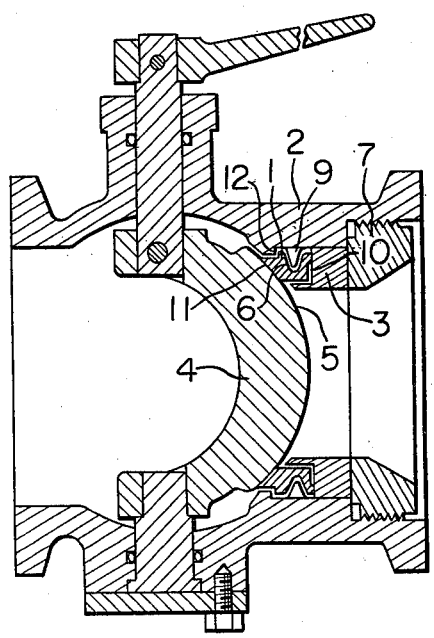
FIG. 5 shows another embodiment of the sealing device according to the present invention which is applied to a valve having a ball-type inner valve.

In the embodiments as shown in FIGS. 3–5, the valve sealing device according to the present invention is applied to the valve body. The valve sealing device may be also applied to the inner valve, without any change in its performance. Furthermore, this valve sealing device is not limited to the forms as described above and may be modified or changed in various ways.

Referring to FIGS. 3–7, 21 is a valve rod which is inserted into a through-hole formed in the inner valve 4, supported in a bore formed in the valve body and projects outward of the valve body 2, 22 is a pin for fixing the valve rod 21 and the inner valve 4 together, 23 is a seal ring for preventing the fluid from leaking out of the valve body 2, 24 is an operating handle for manually rotating the inner valve 4 for 90 degrees at maximum to open or close the fluid passage or to adjust the opening angle to any desired angle, 25 is a pin for fixing the valve rod 21 and the handle 24 together, and 26 is the fluid pressure introducing passage.

The valve body 2 is interposed between flanges of pipes (not shown in FIGS. 1–8), to open or close the fluid flow passing through the pipeline.

Now the sealing action of the valve sealing device according to the present invention will be explained in detail with reference to FIGS. 1 and 2.

Firstly, it is assumed that the valve sealing device according to the present invention is mounted as shown in FIG. 1 and then the inner valve 4 for shutting off the fluid flow is operated by manual force or automatic operating device using pneumatic, hydraulic, electric or other means, to the valve closing position. Then the seat surface 5 of the inner valve 4 comes into contact with the seat contact portion 11 of the seat packing 1. Thus the seat packing 1 is urged toward the side opposite to the fluid passage side and the elastic member 6 of metallic material is simultaneously compressed so that the reaction force is increased. Accordingly the contact pressure between the seat surface 5 of the inner valve 4 and the seat contact portion 11 of the seat packing 1 is increased, to completely shut off the fluid flow.

Nextly, when the inner valve 4 is operated to passage opening position, that is, the seat surface 5 is moved away from the contact position with the seat contact portion 11 of the seat packing 1, the seat packing 1 restores its original shape as shown in FIG. 1, under the action of the metallic elastic member 6.

According to the sealing device according to the present invention, in addition to the action of the metallic elastic member as described above, the fluid pressure is utilized to hold the contact pressure between the seat packing and the inner valve at optimum value relatively to the value of fluid pressure, so that stable and complete shut-off is obtained at any fluid pressure from high to low fluid pressure.

Figure 2:
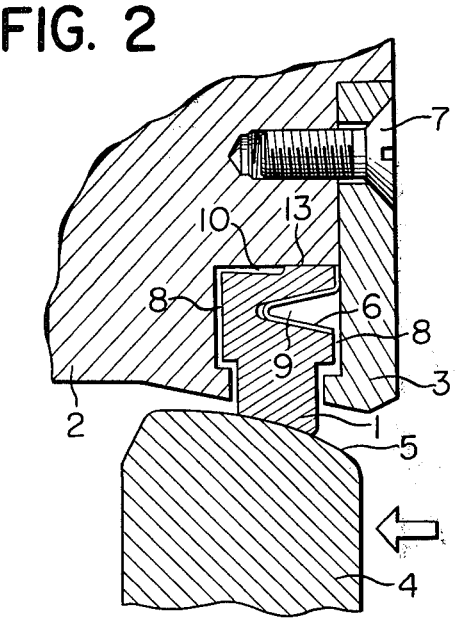
FIG. 2 is a fragmentary enlarged sectional view of the device, showing the principal parts of the device in the state where the inner valve for shutting off the flow of fluid acts against the sealing device to shut off the flow of fluid.

Now, it is assumed that the fluid passes in the direction as indicated by the arrow in FIG. 2. In the state where the inner valve 4 acts to close the fluid passage, the fluid pressure passes through the clearance 8 to the first fluid pressure introducing chamber 9, where it acts on the metallic elastic member, so that the force of urging the seat packing 1 against the seat surface 5 of the inner valve 4 is produced, depending on the difference between the fluid pressure acting on said member and that acting on the contact portion 11 of the seat packing 1 with the inner valve. The fluid pressure simultaneously acts to increase the sealing pressure at the sealing surface 13, thereby completely shutting off the flow of fluid.

According to the construction of the present invention as described above, it is not necessary to increase the initial seat contact surface pressure, namely the seat contact surface pressure at the time when no fluid pressure is applied, in proportion to the increase of the fluid pressure, as in the conventional construction of valve, and it is possible to keep the initial seat contact surface pressure at a constant value, irrespectively of the fluid pressure, so that the force required to operate the valve can be held at a very small value.

The sealing device according to the present invention has a further advantage in that it can utilize the action of the fluid pressure even if the fluid is passed in opposite direction to that indicated by the arrow in FIG. 2. If the fluid is passed in the direction opposite to that of the arrow in FIG. 2, the fluid pressure at the closing position of the inner valve 4 passes through the clearance 8 between the seat packing 1 and the valve body 2 into the fluid pressure introducing chamber 10, so that the force acting to urge the seat packing against the valve seat surface 5 is generated, in the same manner as described above, and at the same time the fluid pressure acts to urge the seat packing to the metallic elastic member 6 to secure the sealing effect toward the downstream side.

In the valve for the purpose of completely shutting off the fluid passage, it is impossible to attain the complete shut off by the metal-to-metal contact, and therefore resins having superior wear-resistant property such as tetrafluoroethylene are employed at the contact portion. However, even if such material is used in the conventional valve, it is only impossible to obtain good initial performance during a short period and it is impossible to produce a valve having good durability, so that it cannot be applied to a valve which is frequently opened and closed.

The sealing device according to the present invention eliminates all of the defects of the prior art as described above and provides a valve having superior performance at a very low cost, since the sealing device can keep its initial performance for a long period and also it is resistant to relatively high temperature (about 250° C.) which is usable limit temperature of the synthetic resin used.

We claim:

1. A valve device comprising:
   (a) a valve body having a fluid flow passage and an annular groove extending around and opening toward said flow passage, said valve body including at least one retainer shoulder in said annular groove;
   (b) a valve pivotally mounted in said valve body for opening and closing said flow passage, and having a peripheral surface;
   (c) an annular seal of synthetic resin disposed loosely in said annular groove and having at least one annular shoulder engageable with said retainer shoulder for the retention of said seal in said groove, said annular seal including an annular portion projecting radially inwardly into said flow passage for engagement with said peripheral surface of the valve upon closing thereof, and an annular peripheral contact surface facing radially outwardly toward a radial boundary surface of said annular groove, said annular seal having a first annular pressure chamber of a substantially V-shaped cross section opening at an axial surface thereof in fluid communication with said flow passage, and a second annular pressure chamber opening radially outwardly adjacent to said annular contact surface in fluid communication with said flow passage; and (d) a resilient metal stiffener ring of a substantially V-shaped cross section disposed substantially complementarily in said first pressure chamber for reinforcing said annular seal, said stiffener ring including an annular flange interposed between said axial surface of the annular seal and an axial boundary surface of said annular groove, said first and second pressure chambers being selectively pressurizable upon closing of said valve for either radially pressing said contact surface and said annular portion of said seal respectively against said radial boundary surface and said peripheral surface of the valve or axially pressing said flange of the stiffener ring against said axial boundary surface.

2. A valve device according to claim 1, wherein said first annular pressure chamber is located radially inwardly of said annular contact surface.

3. A valve device according to claim 1, wherein said second annular pressure chamber is substantially axially aligned with said annular flange of the stiffener ring with said annular contact surface being interposed therebetween.

4. A valve device according to claim 1, wherein said annular flange of the stiffener ring extends radially between said first annular pressure chamber and said annular contact surface.

5. A valve device according to claim 1, wherein said V-shaped stiffener ring is solid in its entirety.

* * * * *